(12) United States Patent
Walker et al.

(10) Patent No.: US 6,553,519 B1
(45) Date of Patent: Apr. 22, 2003

(54) METHOD FOR DETECTING SIGNAL TRANSFER ERRORS IN NEAR REAL TIME IN A DIGITAL SYSTEM

(75) Inventors: Jeffrey J. Walker, Spokane, WA (US); Greg W. Davis, Spokane, WA (US); C Stuart Johnson, Liberty Lake, WA (US)

(73) Assignee: Alcatel Internetworking (PE), Inc., Spokane, WA (US)

( * ) Notice: Subject to any disclaimer, the term of this patent is extended or adjusted under 35 U.S.C. 154(b) by 0 days.

(21) Appl. No.: 09/166,676

(22) Filed: Oct. 5, 1998

Related U.S. Application Data

(60) Provisional application No. 60/072,287, filed on Jan. 23, 1998.

(51) Int. Cl.[7] .............................................. G06F 11/00
(52) U.S. Cl. ...................................... 714/715; 714/718
(58) Field of Search ................................ 370/541, 242, 370/249, 252; 714/715, 799, 819, 820, 821, 823

(56) References Cited

U.S. PATENT DOCUMENTS 5,020,024 A * 5/1991 Williams
5,267,300 A * 11/1993 Kao et al.
5,881,078 A * 3/1999 Hanawa et al.

OTHER PUBLICATIONS

"Switching Basics," *High–Speed Networking with LAN Switches*, by Gilbert Held, chapter 2, pp. 33–61 (1997).
"Frame Switching, Routing, and Protocols," *Fast Ethernet*, by Liam B. Quinn and Richard G. Russell, chapter 7, pp. 109–147 (1997).
"Switched Ethernet and Fast Ethernet Standards," *Switched and Fast Ethernet: How It Works and How to Use It*, by Robert Breyer and Sean Riley, chapter 3, pp. 41–78 (1995).

* cited by examiner

*Primary Examiner*—Phung M. Chung
(74) *Attorney, Agent, or Firm*—Christie, Parker & Hale, LLP

(57) ABSTRACT

Method and apparatus for detecting signal transfer errors in a digital logic system that might occur in a transfer medium between a source device and a destination device. The method includes sending a first diagnostic signal of one or more bits from the source device through the transfer medium to the destination device; comparing the first diagnostic signal received by the destination device with a second diagnostic signal within the destination device to determine if a signal transfer error has occurred; inverting the first diagnostic signal; sending the inverted first diagnostic signal from the source device through the transfer medium to the destination device; and comparing the inverted first diagnostic signal received by the destination device with the second diagnostic signal to determine if a signal transfer error has occurred. Two embodiments of the invention are disclosed. To provide near real time detection without adding signal paths, the diagnostic signals are sent along established signal paths during a diagnostic clock cycle that is added to the normal clock cycles of the digital system.

30 Claims, 2 Drawing Sheets

METHOD FOR DETECTING SIGNAL TRANSFER ERRORS IN NEAR REAL TIME IN A DIGITAL SYSTEM

RELATED APPLICATION DATA

This application is based on provisional U.S. patent application Ser. No. 0/072,287, filed Jan. 23, 1998.

FIELD OF THE INVENTION

This invention relates generally to error detection in electronic circuits and, more particularly, to detection of signal errors in digital systems that might occur in a transfer medium between a source device such as a plug-in card and a destination device such as another plug-in card.

BACKGROUND OF THE INVENTION

Most digital systems require the transfer of signals between integrated circuit devices (ICs). Sometimes these devices reside on a single printed wiring board (PWB). Sometimes the source is on one PWB and the destination device is on another PWB. In the latter case the signals usually travel from one board to the other through one or more electromechanical connectors made from pins and mating receptacles.

Digital system operations rely on error-free signal transfers. Real world environments, however, can introduce errors in the path between devices. For example, the source device's output driver or the destination device's input receiver circuit can fail due to any of a variety of reasons associated with the normal life expectancy of an IC or from environmental stress such as static discharge or power surges. More likely, the electrical connection between an IC and a PWB can fail through mechanical stress or oxidation of a cold solder joint. In the case of socketed devices or signal transfers through PWB connectors, pins can become bent, broken, or otherwise damaged, damaging the electrical connection and causing signal transfer errors.

It is often desirable to detect a signal transfer error as soon as possible so that exception handling procedures can be initiated. At a minimum, these procedures should alert the user that an error has occurred. In more critical applications, these procedures should prevent known-corrupted data from propagating to and rendering useless the rest of the digital system, thereby allowing it to continue operating soundly at a reduced performance level. For example, digital systems containing large amounts of physical memory often realize that memory through the repetitious connection of many smaller memory elements (each one being either one IC or a PWB containing several ICs). The successful detection of signal transfer errors within the memory subsystem could trigger a response to block out, or stop using, the affected portion of memory, allowing operation of the rest of the subsystem to continue until an operator can replace the affected portion. Another example is in the case of a computer network switch, a system designed to intelligently route data between several (often hundreds) of network connections, or ports. Each port, as part of its routing function, uses resources shared by all the other ports, such as memory for temporary data storage. Management of the shared resources is often a centralized function, thereby necessitating the transfer of control signals between each switch port and a central control unit. Transfer errors between any one port and the central control unit have the potential of affecting all ports and causing data corruption throughout the switch. By promptly detecting and locating such errors, offending ports can be disabled before they affect the rest of the network traffic through the switch.

Prior techniques for detecting signal transfer errors in real time include parity and more complex Hamming code data added to digital signals. However, these techniques increase the "signal count" of the system (i.e., the number of signal paths required to carry the data signal and the error-detecting data) and thereby introduce additional points of potential failure. Power-on diagnostics or diagnostics done during an off-line period are also known, but these diagnostics do not detect signal transfer errors as they are occurring, allowing corrupted data to go undetected for some time.

An objective of the invention, therefore, is to provide an improved method for detecting signal transfer errors in near real time in a digital system.

SUMMARY OF THE INVENTION

Method and apparatus for detecting signal transfer errors in a digital logic system that might occur in a transfer medium between a source device and a destination device. The method includes sending a first diagnostic signal of one or more bits from the source device through the transfer medium to the destination device; comparing the first diagnostic signal received by the destination device with a second diagnostic signal within the destination device to determine if a signal transfer error has occurred; inverting the first diagnostic signal; sending the inverted first diagnostic signal from the source device through the transfer medium to the destination device; and comparing the inverted first diagnostic signal received by the destination device with the second diagnostic signal to determine if a signal transfer error has occurred. Two embodiments of the invention are disclosed. To provide near real time detection without adding signal paths, the diagnostic signals are sent along established signal paths during a diagnostic clock cycle that is added to the normal clock cycles of the digital system.

Other features of the invention will become apparent from the following description of two illustrative embodiments and the accompanying drawings.

DETAILED DESCRIPTION OF ILLUSTRATIVE EMBODIMENTS

Figure 1:
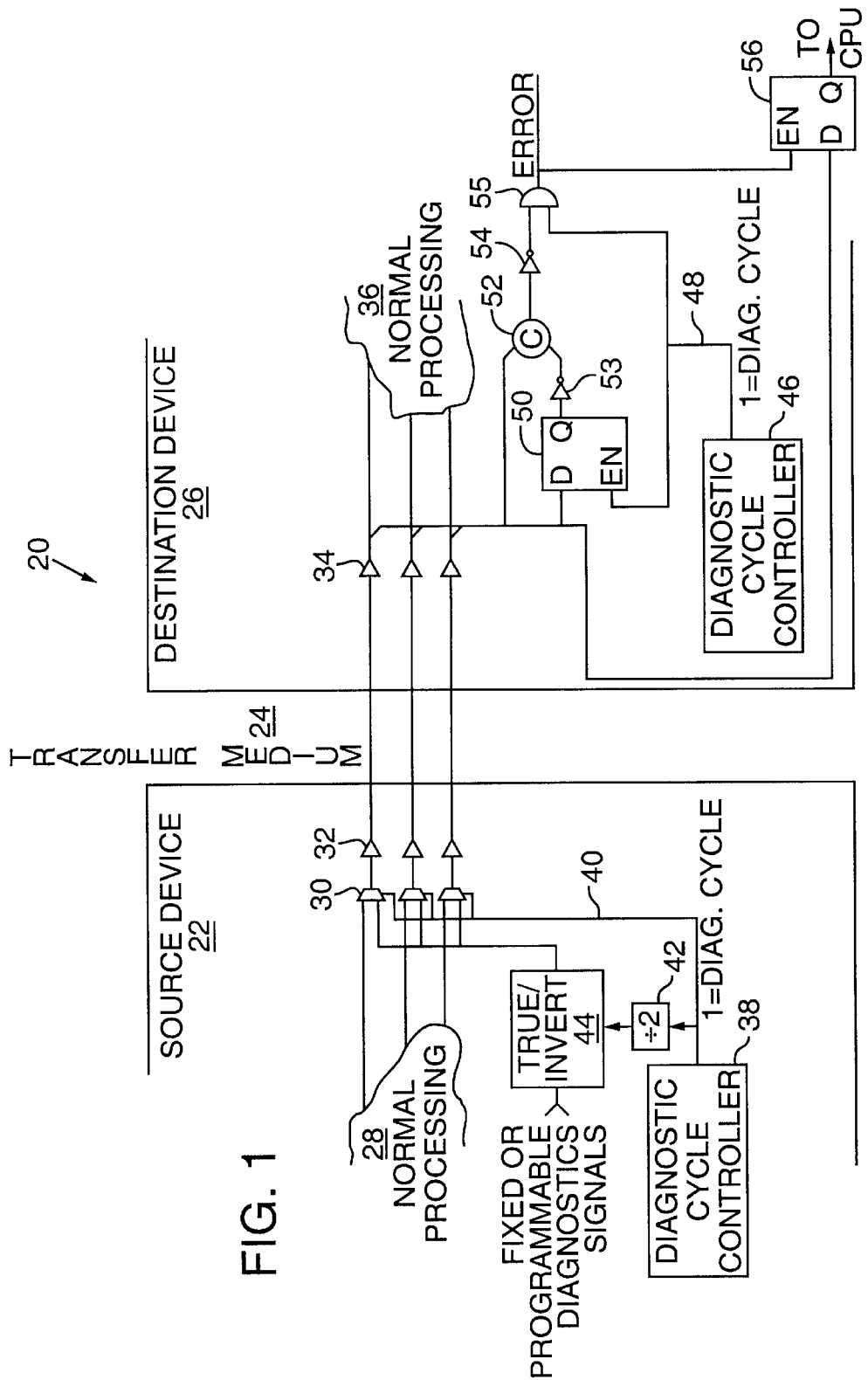
FIG. 1 is a block diagram of a first embodiment of circuit for detecting signal transfer errors in accordance with the invention.

Referring to FIG. 1, a digital system 20 includes a digital signal source device 22, transfer medium 24, and signal destination device 26. The source device 22 is typically a printed wiring board or integrated circuit that is electromechanically connected to the destination device 26 through the transfer medium 24. The medium 24 includes all connections from the IC die pad(s) of the source device to the IC die pad(s) of a destination device, including package pins, IC sockets, printed wiring board traces, inter-board connectors, and intermediate IC devices. The destination device 26 is typically similar to the source device in construction.

Digital system 20 employs a system clock (not shown) to periodically transmit and sample data and control signals between its components, including the source device 22 and destination device 26. By designating one out of every N clock cycles as the one during which a diagnostic signal is sent (referred to here as the diagnostic cycle), and by making N sufficiently small, a near real time selfchecking error detection scheme is realized. The digital system 20, however, must have sufficient bandwidth to support the insertion of the diagnostic cycle into its normal signal flow. That is, out of N clock cycles, only N−1 are available for normal processing. N may be fixed, making the time between each diagnostic cycle a fixed period; or it may vary, allowing the diagnostic cycle to occur at opportune times (i.e. on clock cycles when normal signal transfers are not occurring). The latter scheme affords some flexibility in acquiring the bandwidth necessary to support the diagnostic cycle. Some digital systems inherently have bandwidth overhead that can be used to support the diagnostic cycle (such as video processing systems with horizontal and vertical blanking intervals). Bandwidth-limited systems are required to increase their clock speed by 1/(N−1) to gain the necessary bandwidth. The source 22 and destination devices 26 are synchronized so that each knows when the diagnostic cycle occurs. Synchronization can be achieved through the distribution of a periodic sync pulse from a central timing generator or it can be generated in the source device 22 itself as an additional signal sent to the destination device 26.

During non-diagnostic clock cycles, normal system processing 28 occurs and system data passes through multiplexers 30 and out of the source device through output drivers 32. From there the data signals pass across the transfer medium 24 and into the destination device 26 through input receivers 34 to the normal processing functions 36.

A diagnostic cycle controller 38 in the source device 22 drives a logic one onto signal path 40 during diagnostic clock cycles. The signal path connects to a divide-by-two circuit 42 and to the select lines of multiplexers 30. This controller action drives the circuit 42 to cause a true/invert circuit 44 to pass either the true (i.e., original) or inverted (i.e., complemented) version of a diagnostic signal to the multiplexers 30, alternating between the two versions each time the controller drivers a logic one onto the signal path 40. This controller action also causes the multiplexers 30 to pass the output of the true/invert circuit 44 to the output drivers 32. The diagnostic signal may be one or more bits, depending upon the width of the bus over which the diagnostic signal is sent. In FIG. 1, for example, the diagnostic signal is three bits wide.

A diagnostic cycle controller 46 in the destination device 26 drives a logic one onto a signal path 48 during the diagnostic clock cycles. The signal path 48 connects to the enable input of a register 50 and to an input of an AND gate 55. (For clarity, only one register 50 and associated comparator 52 are shown; there would be a register and comparator for each bit of the diagnostic signal). The diagnostic cycle controller 38 in the source device 22 and the diagnostic cycle controller 46 in the destination device 26 are synchronized by a common sync signal (not shown) so that signal path 48 is driven to a logic one on the clock cycle corresponding to the arrival of the diagnostic signal at the input receivers 34. The register 50 captures the current diagnostic signal at the end of each diagnostic clock, thereby always presenting at its output the value of the diagnostic signal from the previous diagnostic cycle. A comparator 52 continuously compares the diagnostic signal from the input receivers 34 to the inverted version of the previous diagnostic signal received from register 50 and inverted by inverter 53. The output of comparator 52 is then inverted at inverter 54 and applied as one input of an AND gate 55. The other input to the AND gate is signal path 48 from controller 46. When signal path 48 is driven by the diagnostic cycle controller 46 to a logic 1, the AND gate is enabled and the inverted output of comparator 52 is passed as the output of the diagnostic check. An output of logic one from AND gate 55 indicates a signal transfer error has occurred; an output of logic zero indicates no signal transfer error.

The comparison described above of the two diagnostic signals is simply one embodiment. The comparison may be accomplished in any number of ways with or without various inversions of signals. For example, the previous diagnostic signal need not be inverted if the comparator 52 is a device that takes into account the fact that the previous diagnostic signal should be the inverse of the current diagnostic signal. Or the current diagnostic signal be again be inverted (rather than the previous diagnostic signal) before the two signals are applied to comparator 52.

In many cases it is of value to determine the source of the signal error in addition to simply detecting that an error has occurred. To that end, system 20 can include register(s) 56 for capturing the diagnostic signal that contains the error (i.e., the errored signal) using the output signal of AND gate 55. This output signal enables register(s) 56, which receive as input the current diagnostic signal. When an error is detected at the output of AND gate 55, register(s) 56 capture the errored diagnostic signal. The diagnostic signal can then be examined by a CPU or other means to determine which signal path is the source of the error.

The state of the diagnostic signal should be varied often so that stuck-at errors (those in which a failure causes the signal to be received as a constant logic one or zero state) will be detected at the earliest possible time. Consider a failure in which a signal is stuck at logic zero (i.e. a pin shorted to ground). If the diagnostic signal is also logic zero, the failure will not be detected. By causing the diagnostic signal to invert (change state) each time it is sent in the embodiment of FIG. 1, stuck-at errors are detected in, at most, 2N clock cycles. Further, by inverting the diagnostic signal each time it is sent, the need for the destination device to know the expected state of the diagnostic signal during any one diagnostic cycle is eliminated. The destination device 26 need only verify that a toggling action is occurring to confirm that the signal being evaluated is not stuck at logic zero or logic one.

If there are many signals involved in the transfer, as in a multi-bit bus, the diagnostic signal for each member of the bus should differ from those members to whom it might likely be shorted in a failure. Consider a failure in which two members of a bus are shorted together. If the diagnostic signal on each of them is the same, the failure will not be detected. By causing those signals that are likely to be shorted together in a failure to have opposite diagnostic states, shorted signals are detected. In practical applications it may not be possible to determine in advance which signals are likely to short together. In such cases the diagnostic state of all signals in a bus can be programmed by a CPU to provide the optimum signal pattern for a given application or to vary the pattern randomly over time.

Figure 2:
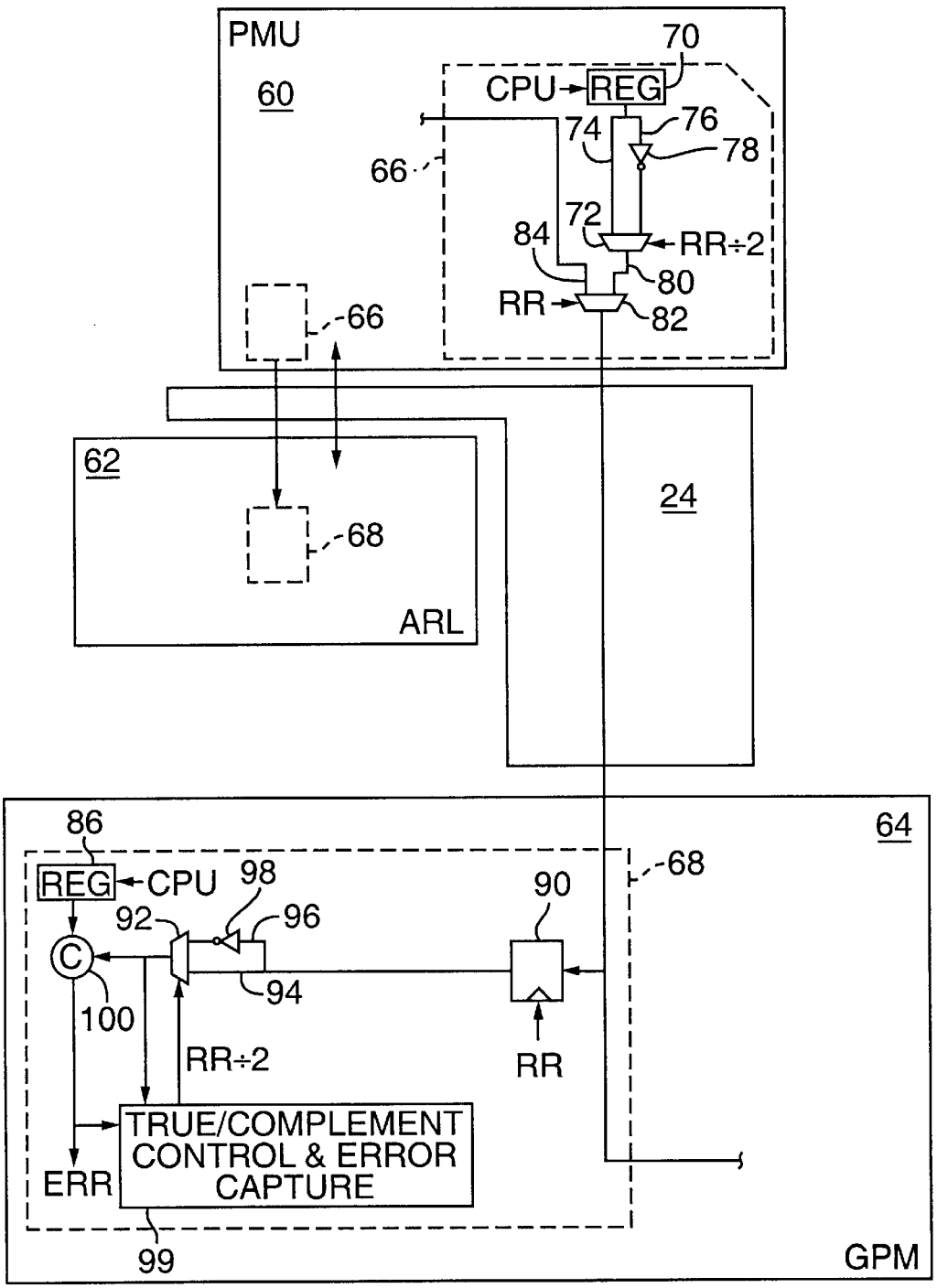
FIG. 2 is a block diagram of a second embodiment of circuit for detecting signal transfer errors in accordance with the invention.

FIG. 2 is a block diagram of a second embodiment of circuit for detecting signal transfer errors in accordance with the invention. This circuit and the method it employs detect a signal transfer failure in which two or more bits of a multi-bit diagnostic signal are shorted together and also detect stuck-at errors for individual bits. FIG. 2 shows part of a computer network switch that includes a number of plug-in cards, one of which contains a packet management unit 60 (PMU) and others of which contain address resolution logic 62 (ARL) and a gigabit packet manager 64 (GPM). As described above, each port of a network switch, as part of its routing function, uses resources shared by all the other ports, such as memory for temporary data storage. Management of the shared resources is often a centralized function, thereby necessitating the transfer of control signals between each switch port and a central control unit. Transfer errors between any one port and the central control unit have the potential of affecting all ports and causing data corruption throughout the switch. By promptly detecting and locating such errors, offending ports can be disabled before they affect the rest of the network traffic through the switch.

The circuit in this embodiment has source 66 and destination parts 68 that are used to detect errors that might occur in the transfer of signals between the card containing the PMU and cards containing the ARL and GPM. FIG. 2 is only one example of how a circuit according to the invention may be employed. The invention, of course, may have other embodiments suitable for use in other types of devices.

In FIG. 2, source parts 66 of the signal detection circuit are within PMU 60 (a signal source device) and destination parts 68 of the circuit are within ARL 62 and GPM 64 (signal destination devices). The source part 66 includes storage such as a register 70 into which a multi-bit diagnostic signal is placed by a CPU or other means. The register 70 is connected to a multiplexer 72 by way of two signals paths 74 and 76. The path 76 contains an inverter 78 so that the true value of the stored diagnostic signal and its inverse are presented as the two inputs to the multiplexer 72. The select line of the multiplexer is connected to a source RR of a diagnostic clock cycle through a divide-by-two circuit which causes the multiplexer to alternately pass the two inputs as its output during successive diagnostic clock cycles. The multiplexer output becomes an input 80 to a second multiplexer 82 whose other input 84 is a signal path carrying a normal data signal for the digital system. The select line of this second multiplexer 82 is connected directly to the source of the diagnostic clock cycle so that the multiplexer selects the diagnostic signal input 80 on diagnostic clock cycles and the normal data signal input 84 on all other clock cycles. The diagnostic clock cycle, as noted above, typically occurs every N clock cycles of a digital system 20 such as once every 28 clock cycles. The multi-bit diagnostic signal has the same number of bits as the data signal so that the output of the multiplexer 82 is a signal of a certain number of bits.

This output signal, which is the true value of the diagnostic signal or its inverse on successive diagnostic clock cycles, is sent from the PMU 60 through a transfer medium 24 to the GPM 64 and ARL 62. As described, the medium 24 includes all connections from components of the source device to the components of the destination device, including buses, package pins, IC sockets, printed wiring board traces, inter-board connectors, and intermediate IC devices.

Within the GPM 64 and ARL 62, the destination part 68 of the error detection circuit includes a latch 90 that captures the diagnostic signal as received by the destination device. The latch 90 is enabled by the source RR of the diagnostic clock cycle so that normal, non-diagnostic data signals sent through the transfer medium on the same signal paths are not captured and evaluated. The output of the latch is connected to a multiplexer 92 by way of two signals paths 94 and 96. The path 96 contains an inverter 98 so that the true value of the latched diagnostic signal and its inverse are presented as the two inputs to the multiplexer 92. The select line of the multiplexer 92 is connected to logic 99 that is the true/inverse control for multiplexer 92 and also a means for capturing an errored diagnostic signal from the output of the multiplexer.

The output of the multiplexer 92 is compared with a second diagnostic signal received from storage such as a register 86. This second diagnostic signal is placed in the register 86 by a CPU or other means. The two diagnostic signals stored in registers 70 and 86 in the illustrated embodiment are the same, though different diagnostic signals (such as a signal and its complement) may be used depending upon the particular implementation of the error detection circuit. The two diagnostic signals are thus compared and, if they are determined to be the same, the comparator 100 indicates at its output that no error was detected, such as by providing a logic one signal separately and to logic 99.

Again, as noted above, the specific way in which the two diagnostic signals are compared is not critical. The inversions may be accomplished in an number of ways; either may be inverted or the comparator may take their states into account in performing the comparison.

With respect to the structure of logic 99, as a control it is connected to the source RR of the diagnostic clock cycle through a divide-by-two circuit to provide a select signal that alternately selects between the two multiplexer inputs on successive diagnostic clock cycles. As a means for capturing an errored diagnostic signal, it includes a register or other storage responsive to comparator 100, which register stores the diagnostic signal when the comparator detects a signal transfer error. A CPU or other means can then examine the captured diagnostic signal to determine the faulty bit(s) and source of the error.

Operation of the error detection circuit in FIG. 2 is as follows. Sometime before a diagnostic clock cycle, a CPU loads registers 70 and 86 with a multi-bit diagnostic signal of the same value. On the next diagnostic clock cycle, multiplexers 72 and 82 pass the diagnostic signal (either its true value or its inverse) stored in register 70 through the transfer medium to the destination parts 68 of the error detection circuit located within the ARL 62 and GPM 64. The latch 90 is enabled during the diagnostic clock cycle to capture the diagnostic signal as received. The true and inverse value of the latched diagnostic signal are applied to the inputs of the multiplexer 92. The combining logic 99 directs the multiplexer 92 to pass the true value of the latched diagnostic signal if the true value of the sent diagnostic signal was passed by the multiplexer 72 and directs the multiplexer 92 to pass the inverse value of the latched diagnostic signal if the inverse value of the sent diagnostic signal was passed by the multiplexer 72. The diagnostic signal emerging as the output of the multiplexer 92 should thus have the true value of the diagnostic signal from the register 70 if no error has occurred in the transfer. The outputted diagnostic signal is then compared against the diagnostic signal stored in the register 86, which also has the original diagnostic signal value. If the comparison is true, no error has occurred and the diagnostic signal is not captured by logic. Once an error is detected, however, the logic 99 is directed to capture the errored diagnostic signal, allowing an inspection to determine which bit(s) of the signal are corrupted.

To improve the chances of detecting errors, the diagnostic signal values in registers 70 and 86 are frequently changed. That is, one pair of values is loaded into the registers for at least two diagnostic clock cycles, then another pair is loaded into the registers for at least two more diagnostic clock cycles, and so forth. The frequency at which the diagnostic signal values are changed is a matter of choice, with a higher frequency providing better detection but requiring more resources.

The inventive scheme requires little or no increase in signal count. That is, unlike other schemes like parity, which require one or more companion signals to be transferred along with the originals (which in turn add additional points of failure), this scheme may require as little as one synchronizing signal be present, which often already exists in the system to meet other requirements.

Having illustrated and described the principles of the invention in exemplary embodiments, it should be apparent to those skilled in the art that the embodiments can be modified in arrangement and detail without departing from such principles. For example, the method and apparatus of the invention may be used in many types of digital system where signal transfer errors are of concern. The particular circuit components described may be interchanged with equivalent components known in the art. Either the true or inverse values can be used in various combinations when comparing diagnostic signals. In view of the many possible embodiments to which the principles of the invention may be applied, it should be understood that the illustrative embodiments are intended to teach these principles and are not intended to be a limitation on the scope of the invention. We therefore claim as our invention all that comes within the scope and spirit of these claims and their equivalents.

We claim:

1. A method for detecting signal transfer errors in a digital logic system that might occur in a transfer medium between a source device and a destination device, the method comprising:
    storing in the destination device a second diagnostic signal;
    sending a first diagnostic signal from the source device through the transfer medium to the destination device;
    comparing the first diagnostic signal received by the destination device with the second diagnostic signal to determine if a signal transfer error has occurred;
    inverting the first diagnostic signal;
    sending the inverted first diagnostic signal from the source device through the transfer medium to the destination device; and
    comparing the inverted first diagnostic signal received by the destination device with the second diagnostic signal to determine if a signal transfer error has occurred.

2. The method of claim 1 wherein the storing step comprises sending a diagnostic signal from the source device through the transfer medium to the destination device and storing the signal in the destination device for a subsequent comparison.

3. The method of claim 1 wherein the first and second comparing steps include inverting the second diagnostic signal as part of comparing the two diagnostic signals.

4. The method of claim 1 wherein the second diagnostic signal and the first diagnostic signal are provided separately to the source device and destination device.

5. The method of claim 1 wherein the second comparing step comprises inverting the inverted first diagnostic signal as part of comparing the two diagnostic signals.

6. The method of claim 1 wherein the digital system employs a clock and a first diagnostic signal is sent every N clock cycles of the digital system, the first diagnostic signal alternating between a first state and an inverted state each time the diagnostic signal is sent.

7. The method of claim 6 wherein N is variable, allowing the first diagnostic signal to be sent non-periodically.

8. The method of claim 1 wherein the first and second diagnostic signals are multi-bit signals.

9. The method of claim 1 including, if a signal transfer error is determined to have occurred, capturing for examination the diagnostic signal that contains the error.

10. The method for detecting signal transfer errors in a digital logic system that might occur in a transfer medium between a source device and a destination device, the method comprising:
    sending a second diagnostic signal from the source device through the transfer medium to the destination device;
    comparing at the destination device the second diagnostic signal with a first comparator signal derived from a stored diagnostic signal to determine if a signal transfer error has occurred;
    sending a first diagnostic signal from the source device through the transfer medium to the destination device, the first diagnostic signal being an inverted form of the second diagnostic signal; and
    comparing at the destination device the first diagnostic signal with a second comparator signal derived from the stored diagnostic signal to determine if a signal transfer error has occurred.

11. The method of claim 10 wherein the digital system employs a clock and a diagnostic signal is sent every N clock cycles of the digital system, the diagnostic signal alternating between a first state and an inverted state each time the diagnostic signal is sent.

12. The method of claim 11 wherein N is variable, allowing diagnostic signals to be sent non-periodically.

13. The method of claim 10 including synchronizing the source and destination devices to send and receive a diagnostic signal.

14. The method of claim 10 including, if a signal transfer error is determined to have occurred, capturing for examination the diagnostic signal that contains the error.

15. A method for detecting signal transfer errors in a digital logic system that might occur in a transfer medium between a source device and destination device, the method comprising:
    storing in the destination device a second multi-bit diagnostic signal;
    sending a first multi-bit diagnostic signal from the source device through the transfer medium to the destination device;
    comparing the first multi-bit diagnostic signal received by the destination device with the second multi-bit diagnostic signal to determine if a signal transfer error has occurred;
    inverting the first multi-bit diagnostic signal;
    sending the inverted first multi-bit diagnostic signal from the source device through the transfer medium to the destination device; and
    comparing the inverted first multi-bit diagnostic signal received by the destination device with the second multi-bit diagnostic signal to determine if a signal transfer error has occurred.

16. The method of claim 15 wherein the digital system employs a clock and a diagnostic signal is sent every N clock cycles of the digital system, the diagnostic signal alternating between a first state and an inverted state each time the diagnostic signal is sent.

17. The method of claim 16 wherein N is variable, allowing diagnostic signals to be sent non-periodically.

18. The method of claim 15 wherein the second comparing step comprises inverting the inverted first diagnostic signal as part of comparing the two diagnostic signals.

19. The method of claim 15 including changing the bit patterns of the multi-bit diagnostic signals and repeating the steps of claim 13.

20. The method of claim 15 wherein the bit patterns of the first and second multi-bit diagnostic signals are the same.

21. The method of claim 15 including, if a signal transfer error is determined to have occurred, capturing for examination the diagnostic signal that contains the error.

22. Apparatus for detecting signal transfer errors in a digital logic system that might occur in a transfer medium between a source device and a destination device, comprising:

means for storing in the destination device a second diagnostic signal;

means for sending a first diagnostic signal and an inverted first diagnostic signal from the source device through the transfer medium to the destination device;

means for using the first diagnostic signal for a comparison with the second diagnostic signal to determine if a signal transfer error has occurred; and means for using the inverted first diagnostic for a comparison with the second diagnostic signal to determine if a signal transfer error has occurred.

23. The apparatus of claim 22 including means for capturing a diagnostic signal that contains an error.

24. Apparatus detecting signal transfer errors in a digital logic system that might occur in a transfer medium between a source device and a destination device, comprising:

in the source device:
storage storing a first diagnostic signal; and
a first multiplexer receiving the first diagnostic signal from the storage, the multiplexer alternately passing to the transfer medium the first diagnostic signal or its inverse on successive diagnostic cycles;

in the destination device:
storage storing a device diagnostic signal;
a second multiplexer receiving the diagnostic signal passed from the first multiplexer to the transfer medium, the second multiplexer alternately passing to a comparator the received diagnostic signal or its inverse on successive diagnostic cycles; and
a comparator comparing the second diagnostic signal with the diagnostic signal passed by the second multiplexer to determine if a signal transfer error has occurred.

25. The apparatus of claim 24 wherein the first and second multiplexers are responsive to a diagnostic enable signal generated on a diagnostic clock cycle of the digital system.

26. The apparatus of claim 24 including a register responsive to the comparator, the register capturing for examination a diagnostic signal that contains the error.

27. The apparatus of claim 24 wherein the apparatus is embedded in a computer network switch.

28. A method for detecting signal transfer errors in a digital logic system that might occur in a transfer medium, the method comprising:

providing a system clock having clock cycles during which data signals are sent from the source device to the destination device and a clock cycle during which a diagnostic signal is sent from the source device to the destination device;

storing in the destination device a second diagnostic signal;

sending data signals during the data signal clock cycles from the source device on the signal path through the transfer medium to the destination device;

sending a first diagnostic signal during the diagnostic signal clock cycle from the source device through the transfer medium to the destination device on the same signal path that the data signals are sent from the source device to the destination device;

comparing the first diagnostic signal received by the destination device with the second diagnostic signal to determine if a signal transfer error has occurred;

inverting the first diagnostic signal;

sending the inverted first diagnostic signal from the source device to the destination device; and comparing the inverted first diagnostic signal received by the destination device with the second diagnostic signal to determine if a signal transfer error has occurred.

29. The method of claim 28 wherein the first diagnostic signal is sent every N clock cycle of the digital system.

30. The method of claim 29 wherein N is variable, allowing the first diagnostic signal to be sent non-periodically.

* * * * *